United States Patent [19]

LeSage et al.

[11] Patent Number: 4,607,857
[45] Date of Patent: Aug. 26, 1986

[54] HOT FAT TRANSPORTING CONTAINER

[75] Inventors: Richard LeSage, Redwood Falls; Eugene N. Reshanov, Golden Valley; Richard A. Schlemmer, Redwood Falls, all of Minn.

[73] Assignee: International Safety Containers of Minnesota, Inc., Redwood Falls, Minn.

[21] Appl. No.: 771,707

[22] Filed: Sep. 3, 1985

[51] Int. Cl.$^4$ .............................................. B62B 1/04
[52] U.S. Cl. ................................ 280/47.26; 220/263; 222/165; 280/47.33; D34/25
[58] Field of Search ............... 222/165, 166; D34/24, D34/25; 220/262, 263, 264, 1 T; 280/47.26, 47.24, 47.33

[56] References Cited

U.S. PATENT DOCUMENTS

| 419,472 | 1/1890 | Plumbly | 280/47.26 |
| 806,885 | 12/1905 | Focht | 280/47.26 |
| 1,819,601 | 8/1931 | Hiatt | 280/47.26 |
| 2,572,486 | 10/1951 | Isaac | D34/25 |
| 4,050,708 | 9/1977 | Samardzija | 280/47.26 |
| 4,274,645 | 6/1981 | Ferguson et al. | 280/47.26 |

FOREIGN PATENT DOCUMENTS 192106 11/1956 Austria .............................. 280/47.26

Primary Examiner—John J. Love
Assistant Examiner—Michael Mar
Attorney, Agent, or Firm—Schroeder & Siegfried

[57] ABSTRACT

A normally upright closed container having foot supports and wheels attached thereto to facilitate the transportation and storage of hot fats and greases. A perforated baffle plate having supporting channels spaced from the container and attached thereto supplies adequate support for the container when in the horizontal position and protects the operators from exposure to dangerous heat while the container is in the upright position. Further safety is provided through insulated handles and a closure member covering the off-set inlet to the container. The container is filled in the horizontal position while resting on the baffle plate and wheels. An insulated handle carried by the axle and a dumpster-engaging flange on the back side of the container are provided to facilitate the safe disposal of the container's contents into a main dumpster.

18 Claims, 6 Drawing Figures

U.S. Patent  Aug. 26, 1986  4,607,857
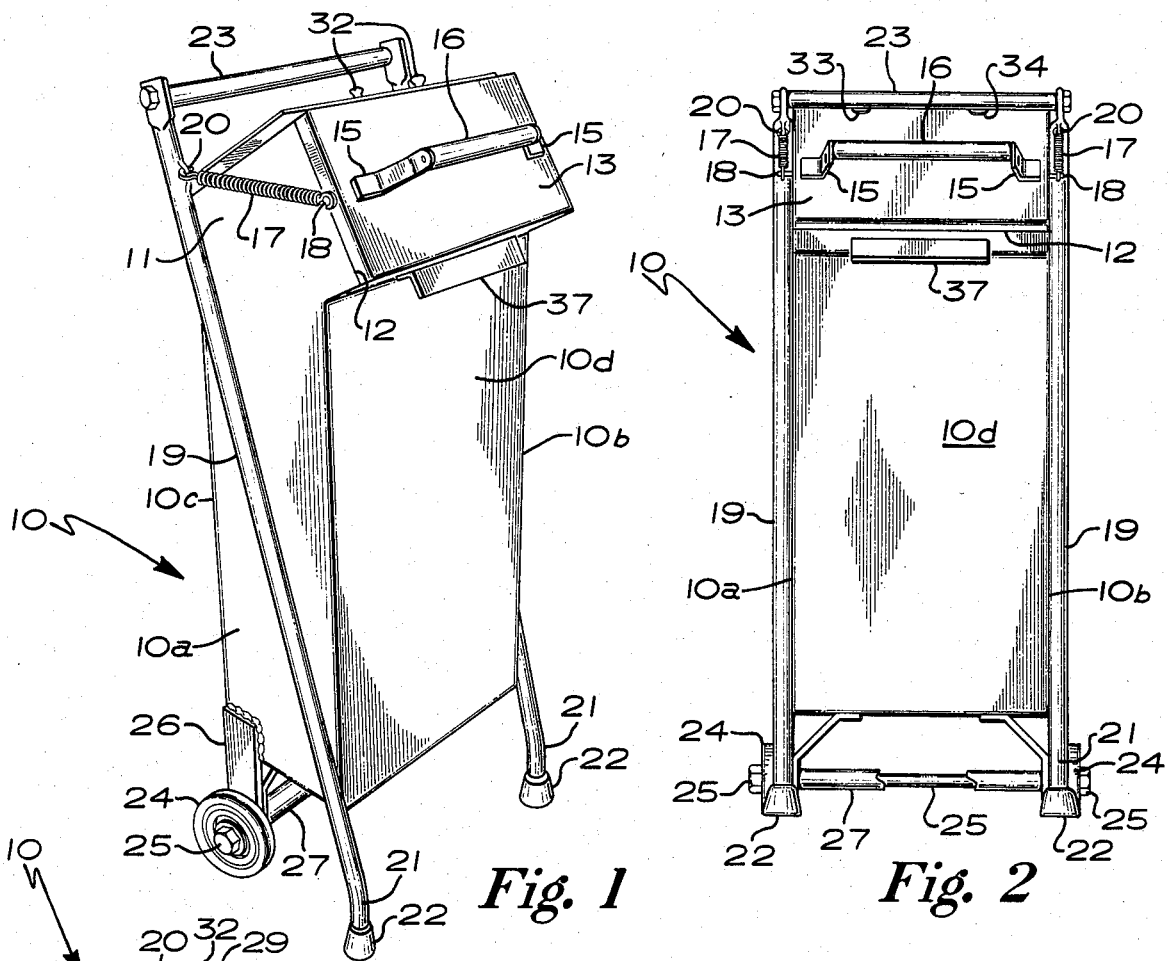
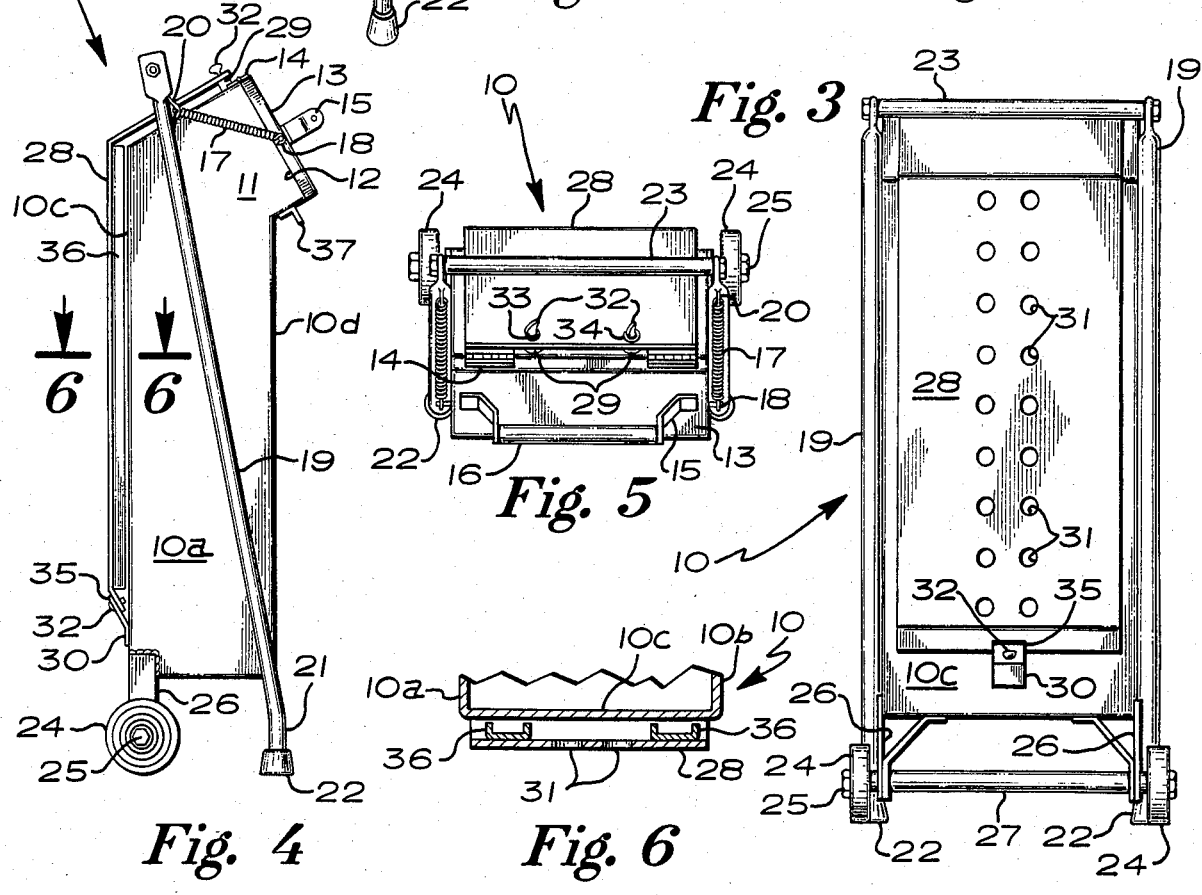

HOT FAT TRANSPORTING CONTAINER

BACKGROUND OF THE INVENTION

The typical commercial restaurant will serve food to hundreds of people each day. To handle this large volume of business, commercial restaurants have resorted to using large volume food fryers to do their cooking. Cooking oils and food wastes in the form of hot fats and greases are generated in large volumes and require disposal each day. Dangerous conditions in handling the hot fats and greases have created a demand for a safe effective means for their disposal.

Any time a person handles dangerous substances such as scalding hot fats and greases from food fryers on a continual daily basis, safety precautions must be taken to prevent serious burning injuries. A container in which the hot fats and greases are emptied into will become quite hot, and if a person were to come into contact with the container, a serious burning injury could result. Therefore, the container must be designed such that minimal handling is necessary in collecting and disposing of the hot fats and greases.

Most commercial restaurants maintain a main storage vat for the hot fats and greases outside the building so as to avoid the smell and hazards of storing the waste material indoors. Because the main storage vat is outside, the person disposing of the hot fats and greases must transport the container a long distance across rough terrain. The longer the distance to the main storage vat the higher the risk is that a possible injury could occur. Therefore, it is imperative that the container be closed and rests on a stable supportive transporting means. Again, the container used for transporting the hot fats and greases must be designed such that transportation can be facilitated without coming in contact with the hot container itself.

In order to dispose of the hot fats and greases, the container must be raised and tipped such that its contents will discharge through its inlet opening into the main storage vat. Again, if care is not taken any bodily contact with the hot container will cause a serious burning injury. Moreover, if the container is accidently dropped resulting in a spillage of the hot fats and greases, serious injury may also result.

Promoting safety by minimizing the dangers discussed hereinabove is the primary objective designing a transport container for hot fats and greases and is, therefore, the primary objective of the invention applied for herein.

BRIEF DESCRIPTION OF THE INVENTION

The hot fat container provides a safe, efficient means for transporting hot fats and greases which are frequently accumulated and necessarily removed from within commercial restaurants. The hot fat container is an elongated normally upright closed container having an inlet throat extending upwardly and outwardly from the longitudinal axis of the container, and an inlet opening. The inlet opening is covered by a closure member which is attached to the container by a pair of hinges. The closure member can be held in the open or closed position through over-dead-center operation of a pair of springs located on each side of the closure member. An insulated handle is mounted on the outermost portion of the closure member to provide safe handling.

Because the primary object of the hot fat container is to provide for safe transportation of hot fats and greases, the front face of the container (which is the side closest to the operator during normal handling) has a spaced baffle plate mounted thereto. The space between the baffle plate and the container allows adequate airflow to minimize heat transfer from the container to the baffle plate. Further air flow is provided through a plurality of perforations in the baffle plate. Heat transfer to the baffle plate is also reduced by the use of insulating washers at the points where the baffle plate is connected to the container. A pair of supporting channels have been attached to the baffle plate and extend inward therefrom towards the container.

In operation, the weight of the hot fats and greases inside the container are transferred through the supporting channels into the baffle plate. Once the container is lifted to the upright position the supporting bars no longer contact the container, thereby precluding any further heat transfer through the supporting channels to the baffle plate. As a result, the baffle plate provides a relatively cool surface facing the operator, thereby preventing serious injuries.

Further support is provided by a pair of wheels mounted upon an axle which is connected to the container just inside the vertical confines of its front face. The wheels also facilitate the easy transportation and maneuverability of the container.

Adequate support is also needed when the container is in the upright position so as to prevent spillage of hot fats and greases. Support and stability is provided by the wheels and a pair of foot supports positioned at the lower back corners of the container. Maximum stability is gained by extending the foot supports outwardly beyond the vertical confines of the container. Slippage of the foot supports on the contacting surface is prevented by placing a pair of end caps on the bottom of the foot supports.

Each foot support is an integral part of a strut which extends downwardly at an angle across each lateral side of the container. The top end of each strut is interconnected by an insulated handle used for transporting and maneuvering the container.

Once the hot fats and greases have been collected in the container, the operator may dispose of its contents by simply hooking the flange, which is connected to the off-set inlet throat of the container, inside the inlet edge of a main dumpster. Then the operator takes hold of the insulated handle which is carried by the axle hereinbefore mentioned and tips the container, such that the hot fats and greases will flow into the main dumpster.

From the discussion above, it is clear that the use of the hot fat container provides a safe, efficient, and extremely effective means of transporting and disposing of hot fats and greases.

BRIEF DESCRIPTION OF THE DRAWINGS

A detailed description of one preferred embodiment of the hot fat container is hereafter described with specific reference being made to the drawings in which:

FIG. 1 discloses a perspective view of a movable container embodying our invention.

FIG. 2 is a rear elevational view of the upright movable container having an inlet opening at its top end and a closure means.

FIG. 3 is a front elevational view of said upright movable container showing its perforated baffle plate and the insulated handles provided for manueverability.

FIG. 4 is a side elevational view of our invention showing the strut members and wheels used for support and transportation of the container.

FIG. 5 is a top plan view of an upright movable container embodying our invention.

FIG. 6 is a sectional view taken along line 6—6 of FIG. 4, illustrating the pair of channel supports connected to the baffle plate for support of the container when in a horizontal filling position.

DETAILED DESCRIPTION OF THE INVENTION

As shown in FIG. 1, our invention includes an elongated normally upright closed container 10 having an inlet throat 11 at its uppermost end which extends upwardly and outwardly in relation to the longitudinal axis of the container 10. The hot fats and greases being transported enter container 10 through an inlet opening 12 at the outermost portion of the inlet throat 11.

Closure member 13 is connected to container 10 by a pair of hinges 14, thereby providing a means for covering inlet opening 12 for safe transportation of the hot fats and greases. Cover handle 15 is connected to the outermost face of closure member 13 and extends outwardly and normally therefrom.

Grip portion 16 of the cover handle 15 is preferably constructed of an insulating material to reduce heat transfer and provide safe operation as container 10 will become quite hot in its normal use. Closure member 13 is held either in the open or closed over-dead-center position by springs 17 located on each of the opposite lateral sides, 10a and 10b, of container 10. Springs 17 are attached to closure member 13 by means of spring cleats 18, said springs 17 extending therefrom to strut members 19 and being connected thereto by means of eyelets 20.

Strut members 19 extend angularly to the longitudinal axis of container 10 and are mounted to its opposite lateral sides, 10a and 10b. the lower ends of strut members 19 form foot structures 21. Foot structures 21 are constructed and arranged to extend outwardly from the vertical confines of container 10 for increased stability. Caps 22 cover the foot structures 21, are made of a rubber-like material, and function to prevent slippage on, or scratching of a contacting surface. The upper ends of strut members 19 are interconnected by means of a second handle 23 also made of an insulating material.

Wheels 24 provide means of transportation and support for the container 10, and are mounted on axle 25. Axle 25 extends transversely between the two opposite lateral sides, 10a and 10b, and lies just within the vertical confine defined by the front side 10c, of container 10. Axle 25 is mounted upon container 10 with support brackets 26. The lower surface of the wheels 24 are in substantially the same horizontal plane as the bottom of foot structures 21, normal to the longitudinal axis of container 10, to provide stability to container 10 in its normal upright position.

As shown in FIG. 2, an axle handle 27 made of an insulating material is carried by axle 25 in telescoped relation thereto, and is used for tipping the container 10 for disposal of its contents into a main dumpster(not shown).

The baffle plate 28, shown in FIG. 4, essentially contours the front side 10c of container 10. The baffle plate 28 provides a spaced supporting surface for container 10 when laid in the horizontal position, and acts as a heat barrier when container 10 is ready for transport in its upright position. Spacer columns 29 and connecting plate 30, to which baffle plate 28 is connected, provide space for adequate air to flow between container 10 and said baffle plate 28. The circulating air minimizes substantial heat transfer to the baffle plate 28 and thereby substantially reduces the danger to the operator.

Further prevention of heat transfer is provided by a plurality of perforations 31 in the baffle plate 28 and insulating washers 32 used at connections 33, 34 and 35, as shown in FIGS. 4 and 5. A pair of supporting channel members 36 are connected to the baffle plate 28 and extend inwardly toward, but not touching the front side 10c of container 10. Supporting channel members 36 effectively provide adequate support of container 10 when the latter is in the horizontal position, but do not abut container 10 in the upright position, thereby prohibiting heat transfer to baffle plate 28.

Flange 37 is connected to the inlet throat 11 of the container 10 and projects in a downwardly direction normal thereto. Flange 37 is used as a catch mechanism which, when the back side 10d container 10 is positioned adjacent to the main dumpster to facilitate the discharge of the hot fats and greases, engages the inner edge of the dumpster inlet and secures same thereto during the dumping operation.

In use our invention is positioned horizontally such that the weight of the container 10 is resting on the baffle plate 28 and the wheels 24, thereby allowing the inlet throat 11 and the inlet opening 12 to point upwardly to facilitate pouring of the hot fats into opening 12. Closure member 13 may then be opened and will stay open through over-dead-center operation of springs 17. As the hot fats and greases are poured into the container, the increased weight in container 10 will transfer through supporting channel members 36 into baffle plate 28. Once the hot fats have been so collected, closure member 13 is closed and the container 10 is brought back to the upright position and easily and safely transported on wheels 24 by pulling on insulated handle 23. When the container 10 is stored in the upright position, foot structures 21 extending outwardly from the vertical confines of the container, provide excellent support to prevent possible spills.

Finally, when it becomes necessary to discharge the contents of container 10, it is positioned adjacent the main dumpster and the inlet opening 12 of the latter positively is engaged by flange 37 to preclude slipping away of the throat member 11 and consequent dangerous spilling of the hot fat. The operator may then empty the contents of the container 10 into the main dumpster by opening closure member 13 and gripping and lifting insulated axle handle 27, thereby tipping container 10 such that the hot fats and greases will run into the main dumpster.

It will be seen from above that our invention will provide a more efficient, effective, and safe means of transporting and disposing of hot fats and greases then has heretofore been available.

In considering this invention it should be remembered that the present disclosure is illustrative only, and the scope of the invention should be determined by the appended claims.

We claim:

1. A hot fat transport vehicle, comprising:
   (a) an elongated normally upright closed container having a front side with a support surface associated therewith, a back side, and opposite lateral sides;

(b) a transverse axle mounted upon said container adjacent the lower portions of said front side;

(c) a pair of wheels rotatably mounted on said axle, one each adjacent each of said opposite sides of said container;

(d) handle means carried by said axle between said wheels;

(e) said container having an inlet throat at its upper end formed as an extension of said front and lateral sides and extending upwardly and outwardly at said back side at an angle to the longitudinal axis of the container, and having an inlet opening at its outer end, said inlet opening extending transversely with respect to the longitudinal axis of said inlet throat;

(f) a closure member carried by said container for closing said inlet opening and being movable between its closed position and its open position relative thereto;

(g) elongated foot structures extending downwardly from said container adjacent its said back side and constructed and arranged to support said container in its upright position in cooperation with said wheels; and (h) second handle means connected to said container for facilitating movement of said container upon said wheels from one location to another wherein said vehicle may assume either a horizontal filling position with the container resting upon said support surface or an upright position with the container being supported by said wheels and said foot structures.

2. The structure defined in claim 1 and a flange member carried by said throat and extending downwardly therefrom to facilitate dumping the hot fats from said container into a main storage vat.

3. The structure defined in claim 1 and (i) a baffle plate carried by the front side of said container in parallel spaced relation thereto and supporting said container upon its supporting surface when said container is moved to its horizontal filling position.

4. The structure defined in claim 1 wherein said axle is disposed beneath said container and within the vertical confines defined by its said front side and said back side.

5. The structure defined in claim 1 wherein said foot structure is constructed and arranged to engage a container-supporting surface outwardly of the vertical confines of said container.

6. The structure defined in claim 1 wherein the lowermost portions of said wheels and said foot structure are in substantially the same plane normal to the longitudinal axis of said container.

7. The structure defined in claim 1, and (j) a pair of parallel upright struts, one each of which is mounted upon one of said opposite sides of said container and each of which extends at an angle to the longitudinal axis of said container;

(k) said second handle member extending between the upper end portions of said struts; and (l) said foot structure being comprised of the lower end portions of said struts.

8. The structure defined in claim 1, wherein said first-mentioned handle means is tubular and is carried by said axle in telescoping relation.

9. The structure defined in claim 1, wherein said closure member carries an insulated cover handle on its outermost surface and is constructed and arranged in an over-dead-center relation.

10. The structure defined in claim 1, wherein each of said handles is constructed of an insulating material.

11. A means for transporting and disposing of hot fats and greases, comprising:

(a) an elongated normally upright container having a closed bottom end, an opening at its top end, and constructed and arranged to facilitate filling with hot fats and greases in its horizontal position;

(b) said container having a front side, a back side and an inlet throat at its upper end formed as an extension of said front and lateral sides and extending upwardly and outwardly at said back side at an angle to the longitudinal axis of the container, and having an inlet opening at its outer end, said inlet opening extending transversely with respect to the longitudinal axis of said inlet throat, and opposite lateral sides;

(c) said front side of said container having a baffle plate associated therewith and connected thereto in a parallel contouring spaced relation;

(d) a pair of strut members mounted to said container, one each adjacent to each said opposite lateral side and constructed and arranged to facilitate transportation and support of said container;

(e) an insulated handle transversely disposed between the top end of said strut members;

(f) an axle transversely disposed between said opposite lateral sides and being within the vertical confines defined by said front and back sides of said container;

(g) a pair of wheels, one each rotatably mounted to each end of said axle adjacent to said opposite lateral sides;

(h) a pair of foot structures connected to said container adjacent its said back side and extending generally downward therefrom; and (i) a closure member constructed and arranged to cover said opening of said container during transportation and to be movable to an open position when filling said container with hot fats and greases wherein said vehicle may assume either a horizontal filling position with the container resting upon said baffle plate or an upright position with the container being supported by said wheels and said foot structures.

12. The structure defined in claim 11, and a pair of channel supports connected to said baffle plate extending inwardly toward said container in a supporting relation thereto.

13. The structure defined in claim 11, wherein said foot structures extend downwardly and outwardly from the lower portion of said container and outside its vertical confines, said foot structures being comprised of the lower end portions of said struts.

14. The structure defined in claim 11, having an insulated axle handle carried by said axle in a telescoping coaxial relation thereto.

15. The structure defined in claim 11, wherein said axle is disposed beneath said container adjacent to its said front side.

16. The structure defined in claim 11, wherein the lowermost portions of said wheels and said foot structures are in a plane substantially parallel to the plane defined by said bottom end of said container.

17. The structure defined in claim 11, and a pair of springs connected to said closure member being constructed and arranged to provide over-dead-center operation of said closure member.

18. The structure defined in claim 11, and a flange member mounted on said throat adjacent the back side of said container and extending downwardly therefrom to facilitate the dumping of hot fats from said container into a main storage vat.

* * * * *